UNITED STATES PATENT OFFICE.

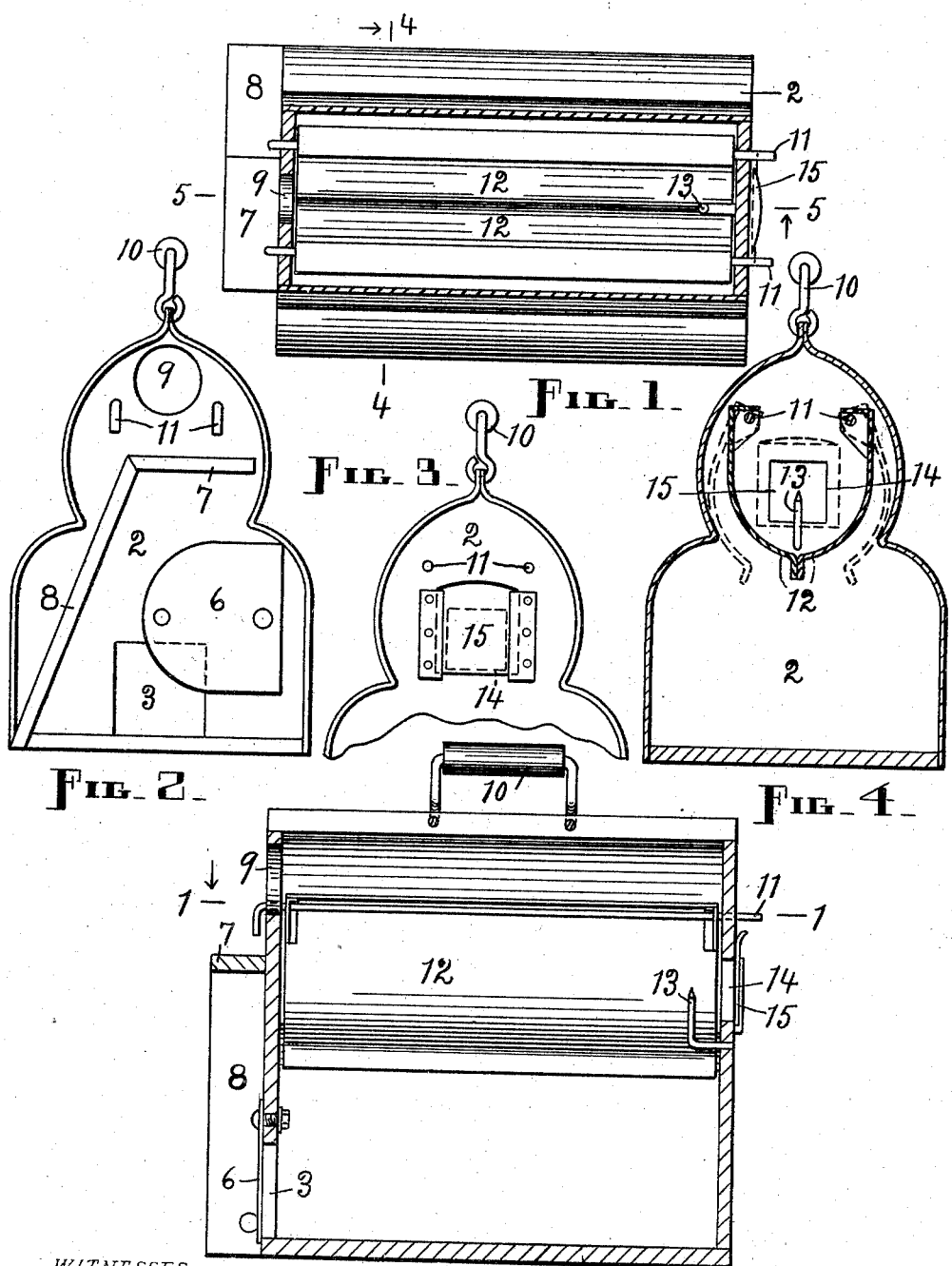

WALLACE J. SEVIGNÉ, OF SPRINGFIELD, MASSACHUSETTS.

ANIMAL-TRAP.

967,576.  Specification of Letters Patent.  Patented Aug. 16, 1910.

Application filed August 4, 1909.  Serial No. 511,090.

*To all whom it may concern:*

Be it known that I, WALLACE J. SEVIGNÉ, a citizen of the United States of America, residing at Springfield, in the county of Hampden and State of Massachusetts, have invented a new and useful Animal-Trap, of which the following is a specification.

My invention relates to improvements in devices designed for catching animals and more particularly rats, and consists essentially of a suitable box having an entrance opening for the animal at one end, a bait support or its equivalent at the other end, and intermediate, gravity-closing members which, when closed, form an apparently stable and safe approach or path to the bait, but yield under the weight of the animal and precipitate it into the compartment below upon the instant said animal alights and then immediately close over the animal so that it cannot escape, all as hereinafter set forth.

The object of my invention is to provide a strong, durable, and comparatively inexpensive trap, of the class described above, which is easily cared for, does not arouse the suspicion of the animal, is certain in its action, and securely imprisons the animal so that it cannot escape. I attain this object by the means illustrated in the accompanying drawings, in which—

Figure 1 is a top plan and partial section, on lines 1—1, looking in the direction of the arrow, in Fig. 5, of a trap which embodies a practical form of my invention; Fig. 2, an elevation of the left-hand or what may be termed the front end of said trap; Fig. 3, an elevation of the upper portion of the right-hand or what may be termed the back end of said trap; Fig. 4, a transverse vertical section on lines 4—4, looking in the direction of the associated arrow, in Fig. 1, and Fig. 5, a longitudinal vertical section on lines 5—5, looking in the direction of the associated arrow, in Fig. 1.

Similar figures refer to similar parts throughout the several views.

Although in the following description the device will be described as a trap for rats, it is to be understood that mice and other small animals can be caught with it equally well.

Having reference to the drawings it will be observed that I provide a closed receptacle or box 2, which may be of any suitable size and shape, although preferably being wider transversely at its lower part so as to afford ample room for a number of rats caught and imprisoned at one time and thus avoid the necessity of removing each rat from the trap before being able to catch others. In one end of the box 2, the front end in the present case, there is an opening 3 at the bottom through which the rats caught are expelled. A suitable door 6, shown open in Fig. 2, is provided for the opening 3. On the front end of the box, outside and about two-thirds of the distance from the base to the top, is a horizontal platform 7, leading to which from the ground is an inclined run-way 8. Above this platform is an opening 9 in the front end.

10 represents a handle attached to the top of the box for convenience in carrying it about.

Swinging freely at the top from two horizontal parallel rods 11, spaced apart on the same horizontal plane and supported in the ends of the box 2, are two interiorly concave shutters 12 which form a false bottom or unstable run-way or passageway the whole length of said box inside. The shutters 12 are so shaped and located as normally to meet or abut along their lower edges, to swing apart and open under a very slight weight within, and to precipitate whatever gets into the run-way formed by said shutters into the box compartment below. The side walls of the box are interiorly curved in such a way as to afford no foot-hold for the rats, and the same thing is true of the shutters 12.

Fastened to the end of the box 2 opposite that in which the opening 9 is made, or the back end, on the inside, is a hook 13 upon which it is designed to place bait, such as a piece of cheese for example, for the lure of the rats. The hook 13 is arranged to support the bait a short distance above the bottom of the shutters 12 when closed. Convenient access to the hook 13 is had through an opening 14 in the back end of the box, a door or slide 15 being provided on such end with which to close said opening. It is through the opening 14, when the slide 15 is drawn up or open, that the bait is affixed to the hook 13.

It will now be seen that the only entrance to the box 2, assuming that the door 6 and the slide 15 be closed as they should be when the trap is prepared for use, is by way of the opening 9, and that there is in reality no real path from such opening to the bait on the hook 13 at the other end of the box from said opening, but only the path furnished by the shutters 12 which although apparently stable is most unstable. In no way apparent or otherwise can the bait on the hook be reached excepting by the approach which the shutters seem to offer and which arouses no suspicion on the part of a rat that has smelled the bait, has mounted the platform 7, and is looking through the opening 9. Having arrived at this point it is but an instant before the rat jumps through the opening 9 in an endeavor to reach the bait by way of the apparently stable path which intervenes, but the instant the rat strikes the shutters 12 they swing apart or open and precipitate it into the compartment below and then immediately swing together or close again over said rat, thus shutting it securely in said compartment and resuming a position in readiness for the next victim. Even though the rat should first strike against one of the shutters, instead of landing squarely at the junction formed by them, their shape is such that the rat could get no foot-hold, but would instantly roll down and pass between said shutters into the lower compartment. The rat never reaches the bait, either before or after falling through the false bottom, and is unable to climb out of the box—it must remain a prisoner until removed by way of the opening 3.
The dotted lines, in Fig. 4, indicate the positions of the shutters 12 when swung outward at their bases as far as possible against the sides of the box 2. This maximum amount of opening is not always produced and is not necessary, the amount of separation varying according to the weight of the rat, the direction from which or the angle at which it drops or falls, and the impact resulting from the fall or drop. So well balanced are the shutters that they close by gravity or automatically as soon as the rat passes between and below them, as already noted. The area of the top portion of either shutter is not large enough nor is there space sufficient between such portion and the adjacent part of the box for the rat to crawl along the same to the bait, and it could not reach the bait from such position on account of the height of the latter.
More or less change in the shape, size, and minor details of construction may be made in this trap without departing from the nature of my invention.

What I claim as my invention, and desire to secure by Letters Patent, is—

1. The combination, in a trap, with a box provided with an exterior fixed platform at one end and with interior retaining means for bait at the opposite end and having an entrance opening above said platform in that end of the box, the latter being otherwise closed, of depending shutters spaced apart at the top and normally closed by gravity at the bottom and extending the entire distance between the ends of the box, and pivotal connections between said shutters at the top and said ends of the box, said shutters being curved to form when closed a false passageway in the shape of an inverted arch leading from the end of said box in which is the entrance opening to the end of said box where said bait retaining means is located.

2. The combination, in a trap, with a box provided with an exterior fixed platform at one end and with interior retaining means for bait at the opposite end and having an entrance opening above said platform in that end of the box, the latter being otherwise closed and being constricted longitudinally below the top thereof, of depending shutters spaced apart at the top and normally closed by gravity at the bottom and extending the entire distance between the ends of the box, and pivotal connections between said shutters at the top and said ends of the box, the parts being so constructed and arranged that said shutters are supported with their lower portions within the aforesaid constricted portion of the box, and said shutters being curved to form when closed a false passageway in the shape of an inverted arch leading from the end of said box in which is the entrance opening to the end of said box where said bait-retaining means is located.

3. The combination, in a trap, with a box having a vaulted top and constricted longitudinally below such top, provided with an exterior fixed platform at one end and with interior retaining means for bait at the opposite end, and having an entrance opening above said platform in that end of said box, and an opening in the aforesaid opposite end to give access to the bait-retaining means, and a closure for said last-mentioned opening, of shutters in the vaulted top of said box with their lower portions in the aforesaid constricted portion of said box and pivotally connected at the top with the ends of the box, such shutters being spaced apart at the top and normally closed at the bottom by gravity, extending the entire distance between said ends of the box, and being curved to form when closed a false passageway in the shape of an inverted arch leading from the end of the box in which is the entrance opening to the end of the box where said bait-retaining means is located.

4. The combination, in a trap, with a box provided with an exterior platform at one end and with interior retaining means for bait at the opposite end and having an entrance opening above said platform in that end of the box and an opening in the aforesaid opposite end to give access to said bait-retaining means, and a closure for said last-mentioned opening, the top of said box being vaulted, of gravity-closing shutters extending the entire distance between the ends of the box and pivotally connected with said ends, such shutters being curved to form when closed a false passageway in the shape of an inverted arch leading from the end of the box in which is the entrance opening to the end of the box where said bait-retaining means is located.

WALLACE J. SEVIGNÉ.

Witnesses:
F. A. CUTTER,
A. C. FAIRBANKS.